United States Patent
Goeke

[11] 3,969,919
[45] July 20, 1976

[54] WORKPIECE FEED CHANNEL

[75] Inventor: Alfons Goeke, Solingen, Germany

[73] Assignee: Th. Kieserling & Albrecht, Solingen, Germany

[22] Filed: July 10, 1975

[21] Appl. No.: 594,732

[30] Foreign Application Priority Data
July 12, 1974 Germany............................ 2433600

[52] U.S. Cl.............................. 72/405; 72/160; 72/422; 72/428; 226/172
[51] Int. Cl.[2]............................................ B21D 3/04
[58] Field of Search ............ 72/405, 422, 428, 419, 72/160, 190, 184, 95, 88

[56] References Cited
UNITED STATES PATENTS

| | | | |
|---|---|---|---|
| 191,085 | 5/1877 | Thompson ............................. | 72/88 |
| 518,403 | 4/1894 | Haas ...................................... | 72/160 |
| 2,742,144 | 4/1956 | Meyerbach ............................ | 72/20 |
| 3,103,306 | 9/1963 | Van Eldik ............................ | 226/172 |
| 3,107,006 | 10/1963 | Myotte ................................. | 72/428 |
| 3,285,485 | 11/1966 | Slator ................................... | 226/172 |
| 3,351,034 | 11/1967 | Grek ..................................... | 113/120 |

*Primary Examiner*—C.W. Lanham
*Assistant Examiner*—Gene P. Crosby
*Attorney, Agent, or Firm*—Edward E. Sachs

[57] ABSTRACT

A workpiece feed channel interposed between a metal peeling machine and straightener for elongated, rotating or non-rotating, metal workpieces. The channel includes a plurality of opposed pairs of driven profiled elements having workpiece receiving openings therebetween of a cross-sectional size approximately 1.5 to 10 times larger than the cross-sectional size of the workpieces carried therein. The workpieces are carried by and fed forwardly by the gravitational frictional engagement with the profiled elements. In one embodiment, the upper profile elements are raised to permit the release of the workpiece down inclined surfaces, rather than for the workpiece to continue on to the straightening machine.

23 Claims, 4 Drawing Figures

WORKPIECE FEED CHANNEL

This application pertains to the art of workpiece feed channels for use in conjunction with metal peeling machines and metal straightening machines for elongated rods and tubes and, more particularly, to such feed channels having contact surfaces for carrying the workpieces longitudinally therethrough. The improved feed channel of the present invention is used for feeding rotating or non-rotating elongated workpieces, from a peeling machine, or to or from a straightening machine.

It has been found that some of the problems arising during a metal workpiece straightening operation, as well as the cost for the straightening machine itself, can be directly related to the apparatus and/or process for feeding the workpiece to the metal working machine.

In the prior art machinery for working elongated workpieces such as rods or tubes commonly includes a peeling machine located in line with a straightening machine, and a feed channel is located between the machines for feeding the workpieces from the peeling machine to the straightening machine. It is conventional to feed the workpieces through the feed channel from one machine to the other by pushing them onward through forces applied to their end faces so they slide through the feed channel. In such an arrangement, the diameter of the feed channel should not be more than two times the diameter of the workpieces, and is preferably smaller, in order to insure engagement between the end faces of adjacent workpieces. This feeding arrangement is not satisfactory for conical or double conical workpieces because the diameter of such workpieces at one or both ends is much smaller at the other end or at the center and the workpieces push past one another. Conically peeled rods in particular are usually bent rather severely and require very complex feed means to prevent them from jamming in the feed channel which frequently results in damage to either or both of the rods and feed channel.

Where a straightening machine is used independently, the feed channel must be large enough to allow lateral introduction of severely bent workpieces and this requires that the feed channel must be adapted for different sizes and shapes of workpieces. This results in loss of time and increased material costs.

In a two-roll straightening machine, the workpieces rotate and the ends of bent workpieces remaining in the feed channel undergo flailing movements which may damage the feed channel and workpieces. The damage caused by such flailing movements is directly related to the size of the feed channel, and to the longitudinal and rotational speed of the workpieces relative to the feed channel. Damage becomes most serious when the diameter of the feed channel must be extremely large to accommodate severely bent workpieces.

Workpieces must have a certain amount of kinetic energy to be fed between the rolls of a two-roll straightening machine, and such energy is commonly imparted to the workpieces by a two-roll feed device located between the feed channel and straightening machine.

Upwardly open feed channels having individually driven rollers for moving workpieces therethrough are known but severely bent workpieces may not contact the drive rollers, and rotation of workpieces relative to an open channel is undesirable.

There are many known devices commonly referred to as caterpillar-like treads for carrying workpieces. Such devices usually have opposed pairs of profiled elements mounted on driven chains for positively gripping workpieces and pulling them from a drawing die or molding machine. The profiled elements positively and continuously grip the workpiece so that the pulling force is applied over a large area and length of the workpiece. Examples of devices of this type include those disclosed in U.S. Pat. Nos. 2,742,144, issued Apr. 17, 1956, to Meyerbach; 3,103,306 issued Sept. 10, 1963, to Van Eldik; and 3,351,034 issued Nov. 7, 1967, to Grek. Such devices include adjusting means for adjusting the mechanisms on which the profiled elements are mounted to grip workpieces of different diameters or to vary the gripping force. However, the workpiece is always positively gripped by the profiled elements so that the workpiece receiving opening between opposed pairs of profiled elements is always slightly less than the diameter of the workpiece and it is not possible for a workpiece to rotate relative to the profiled elements.

It is therefore the primary object of the invention to provide an improved workpiece feed channel which is capable of positively feeding workpieces of various sizes smaller than the size of the feed channel.

It is a further object of the invention to provide a feed channel which is capable of positively feeding rotating or non-rotating workpieces.

It is another object of the invention to provide a feed channel for positively feeding elongated bent workpieces to a two-roll straightening machine.

It is an additional object of the invention to provide a feed channel for feeding elongated bent workpieces from a peeling machine to a straightening machine in an improved and efficient manner which minimizes damage to the feed channel and workpiece.

It is also an object of the invention to provide an improved method of feeding elongated workpieces.

An aspect of the present invention resides in a workpiece feed channel having a plurality of opposed pairs of driven profiled elements between which workpiece receiving openings are defined and have a cross-sectional size of approximately 1.5 to 10 times larger than the cross-sectional size of the workpieces carried thereby so that the workpieces are carried by their gravitational frictional force of engagement with the profiled elements.

The feed channel has input and output ends between which the profiled elements are driven in a predetermined direction for feeding the workpieces. In effect, the channel "eats" the workpieces introduced to its input end so that longitudinal curvature of the workpieces is not a problem and a feed channel of relatively small diameter will handle a large range of workpiece sizes or diameters while also allowing the workpieces to rotate.

A feed channel according to the present invention requires no additional workpiece feed rolls at its output end for feeding workpieces from the output end into a workpiece handling machine. Where the workpiece handling machine adjacent the output end is a straightening machine, the workpieces simply move between the straightening rolls at the speed imparted to them by the feed channel. Elimination of a separate two-roll feeding unit also eliminates the rather complex control required for such unit.

The feed channel of the present invention is especially useful in manufacturing arrangements for elongated rods or bars where peeling and straightening machines are in line with one another, and the feed channel is arranged between the machines. As long as the rear end of the workpiece is held in the peeling machine, it can be fed without rotation into the input end of the feed channel. As soon as the front end of the workpiece enters the straightening machine, the workpiece can rotate relative to the feed channel. Double conical rods can also be fed by the feed channel with no slippage of such rods past one another.

With a feed channel constructed in accordance with the present invention, the frictional velocity of a rotating workpiece traveling through the straightening rolls is reduced relative to the feed channel because the feed velocity friction component, or longitudinal frictional component is absent or minimized because the profiled elements are traveling in the same direction as the workpiece. This essentially leaves only the rotational frictional component.

According to one preferred embodiment of the invention, all of the profiled elements constituting one half of the channel profile are fitted to the links of a first circulating chain, while all of the profiled elements constituting the other half which completes the channel profile are fitted to a second chain operating in the same plane. However, there would be no substantial disadvantage in otherwise arranging the chains, such as in two planes at right angles to each other, to divide the channel profile diagonally. The profiled elements accompany the workpiece at the feed velocity for allowing the workpiece a certain degree of freedom and the workpiece cannot come into contact with the end faces of the profiled elements. The pin chain for the channel is a commercially available standard part, with the separate profiled elements being secured to coupling members in the chains. The chains are carried around sprockets and only one sprocket for each chain need be driven. The driven sprockets drive the chains carrying the profiled elements with the workpiece inside.

In the case of workpieces having a small or medium amount of curvature, all of the profiled elements constituting one part of the channel profile are adapted to be moved simultaneously away from the center of the channel profile, while all of the profiled elements constituting the other part of the profile have sloping surfaces on which the workpiece may roll.

Where the feed channel is divided into upper and lower separable parts, curved workpieces can be transported and placed in lower profiled elements with rolling surfaces for lateral introduction or discharge of workpieces relative to the channel. Where the rolling surfaces are downwardly inclined from the longitudinal axis of the channel profile, workpieces will be automatically discharged laterally by rolling down the surfaces upon separation of the upper and lower parts. It is also possible to laterally introduce workpieces into the lower profiled elements when the parts are separated by providing the lower profiled elements with inlet slopes downwardly inclined toward the longitudinal axis of the channel profile. Arangements of this type make it possible to provide buffer storage between the straightening and peeling machines so that the peeling machine can continue to operate if the straightening machine malfunctions. A closed channel of the type described may be used for virtually all types of straightening, regardless of the degree of curvature of the material to be straightened.

In a preferred arrangement, the profiled elements of the feed channel are driven at a speed slightly greater than the speed at which workpieces are introduced thereinto by the feed rolls of the peeling machine, and slightly less than the longitudinal speed at which the workpieces are pulled through the straightening rolls.

For a better understanding of the present invention, together with other and further objects thereof, reference is had to the following description taken in connection with the accompanying drawings, and its scope will be pointed out in the appended claims.

Figure 1:
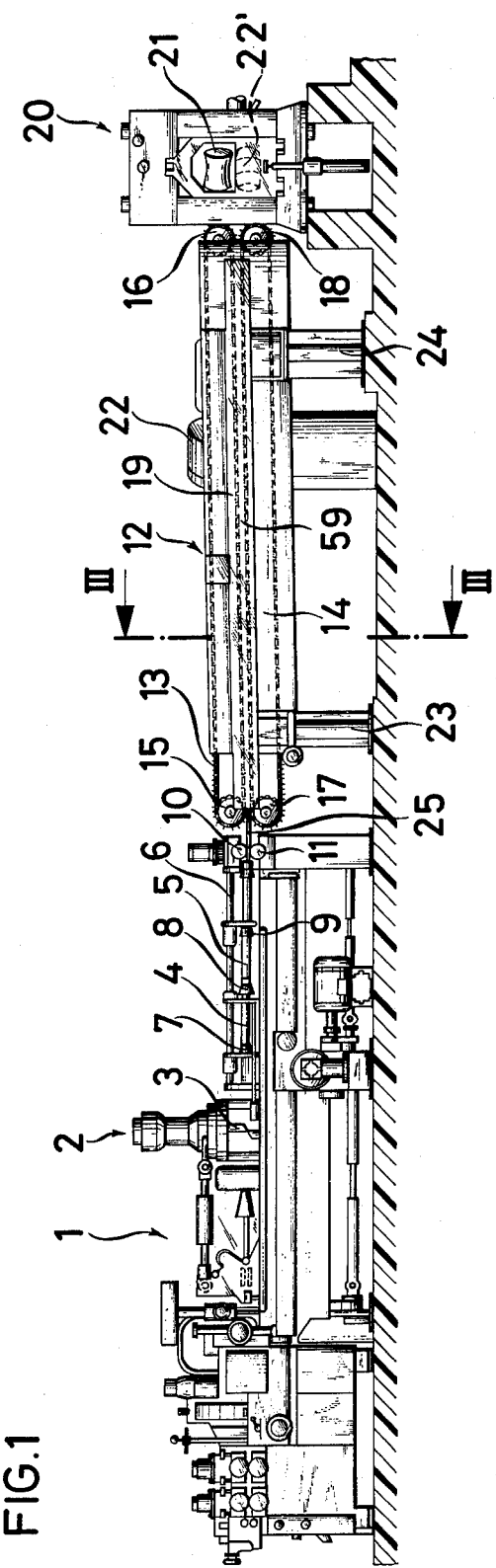
FIG. 1 is a side elevational view of a feed channel constructed in accordance with the invention arranged between in-line peeling and straightening machines.

With reference to FIG. 1, a workpiece handling device for operating on workpieces is shown as a peeling machine 1 having a gripping carriage 2 adapted to travel back and forth, and carrying a shear or parting device 3. The peeling machine 3 has telescopic guide tubes 4, 5 and 6 with inlet funnels 7, 8 and 9. At its outlet end, the peeling machine 1 has a workpiece feed means in the form of two feed rolls 10 and 11.

A feed channel 12 according to the invention basically includes two circulating pin chains 13 and 14, each of which is mounted on at least two guide sprockets 15 and 16, and 17 and 18, with such sprockets having peripheral teeth for the chains. A housing 19 encloses each run of the chains 13 and 14, and is open at the input and output ends of the feed channel 12.

The feed channel 12 is upwardly inclined from left to right in FIG. 1 in order to compensate for the difference in level between the peeling machine 1 and the two-roll straightening machine 20. This inclination is achieved by stepping the foundation instead of adjusting the supports 23 and 24.

The straightening machine has rolls 21 and 22', and both are preferably driven, although only drive motor 22 for the upper straightening roll 21 is shown. The feed channel 12 is longer than the longest workpiece to be processed in the peeling machine, and the sprockets 16 and 18 remote from the peeling machine, and adjacent the straightening machine, are driven in a direction for carrying the workpieces from the peeling machine 1 to the straightening machine 20

Figure 2:
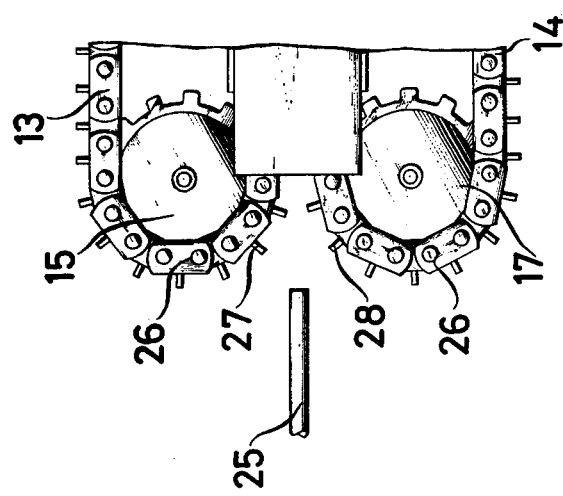
FIG. 2 shows an input end portion of the feed channel with a workpiece entering thereinto.

FIG. 2 shows the idler sprockets 15 and 17 carrying the chains 13 and 14, together with a workpiece 25 about to be introduced into the input end of the feed channel. Each chain 13 and 14 comprises links 26 hinged to each other by pins, and with the links of the two chains having profiled elements 27 and 28 arranged in pairs in relation to each other. In the housing 19, two profiled elements face each other to form the profile of the feed channel. That is, each pair of profiled elements define a workpiece receiving opening therebetween and such opening has a cross-sectional size approximately 1.5 to 10 times larger than the cross-sectional size of the workpieces. The cross-sectional shape of the opening is also generally the same as the cross-sectional shape of the workpiece.

Figure 3:
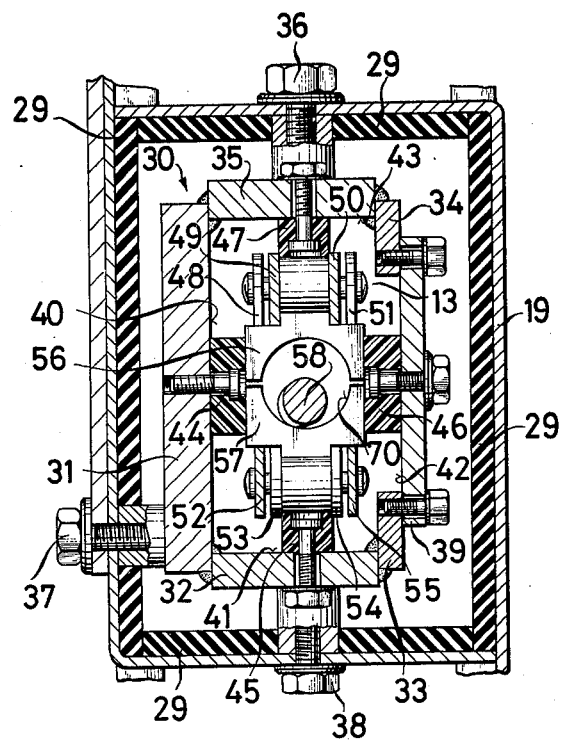
FIG. 3 is a cross-sectional elevational view taken generally along line III—III of FIG. 1.

FIG. 3 shows a cross-section of the working runs of the chains 13 and 14, and the housing 19 which may be of sheet metal and have a noise or sound deadening lining 29. Held in the housing 19 as by bolts 36, 37 and 38, is a generally C-shaped guide housing 30 made from a plurality of strips 31, 32, 33, 34 and 35 welded together. The open side of guide housing 30 is closed off by a removable strip 39 secured in place by suitable screws or bolts. This makes assembly and repair easy by providing easy access to the working runs of the chains 13 and 14, and the profiled elements carried thereby. The guide housing 30 has internal surfaces 40, 41, 42 and 43 carrying guide bars 44, 45, 46 and 47 which are bolted to the strips 31 - 35, and are preferably made of a synthetic plastic material, although other materials could also be used. The guide bars 45 and 47 mainly guide the lower or working run of the chain 13, and the upper or working run of the chain 14, in the vertical direction, but also provide limited guidance in the horizontal direction because of projecting portions of the connecting links 49, 50, 53 and 54 which project outwardly of the chain pins.

Each profiled element 56 in the chain 13 is carried by two coupling members 48 and 51. Profiled element 57 is carried accordingly on chain 14 by two coupling members 52 and 55. The coupling members may be welded, screwed, or clamped to the profiled elements and the chain connecting links.

The guide bars 44 and 46 are provided expressly to guide the profild elements laterally. In the operative position shown in FIGS. 3 or 4, each pair of profiled elements 56 and 57, or 27 and 28, constitutes a closed and preferably circular corss-section feed channel profile or opening in which workpiece 58 may rotate.

According to the invention, provision may be made for both housing 19 and guide housing 30 to be divided approximately horizontally into upper and lower parts. In such an arrangement, a joint 59 separably divides housing 19 and guide housing 30 into a removable upper part 60 and a lower part 61. In this form, each profiled element 62 and 63 has two guide bars 66 and 67, and 64 and 65, respectively. In contrast to profiled elements 56 and 57, profiled elements 62 and 63 are not of the same shape in that element 62 has a laterally downwardly inclined slope 68 off which the workpiece may roll when upper part 60 of housing 19 is lifted. Profiled element 63 has an extension 69 for mating with slope 68.

Figure 4:
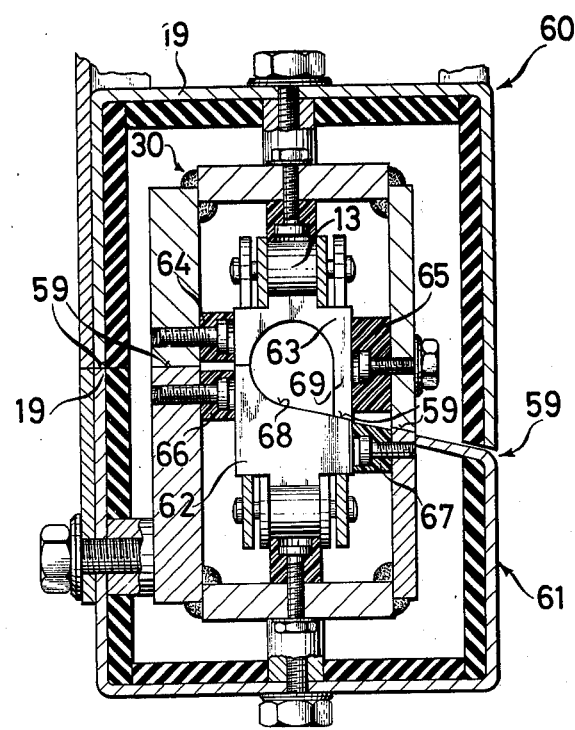
FIG. 4 is a view similar to FIG. 3 showing another modified feed channel.

In the arrangement of FIG. 4, each chain of the feed channel is mounted on a separate mechanism and housing, with at least one such mechanism being movable away from the other for lateral movement of workpieces relative to the lower profiled elements on the lower mechanism.

After being pulled from the peeling machine 1, the workpiece 25 is introduced into the closed feed channel 12, and is enclosed in a plurality of opposed pairs of the profiled elements 27 and 28, 56 and 57, and 62 and 63, which face one another in their operative positions along the working runs of the chains. As soon as the workpiece leaves the feed rolls 10 and 11, it is carried along in the channel 12 by the friction arising from its own weight on the profiled elements. Since the workpiece is not clamped, it is free to rotate relative to the feed channel 12 between the opposed pairs of profiled elements. For example, workpiece 58 comes into contact with areas 70 of the profiled elements in FIG. 3 and is driven or carried along without any additional feeding devices between the straightening rolls 21 and 22' of the two-roll straightening machine 20. If the workpiece need not, must not, or cannot be straightened, the embodiment shown in FIG. 4 makes it possible to discharge the workpiece laterally of the feed channel 12. This is done by lifting the upper part 60 of housing 19, the chain 13 and all parts connected thereto, whereupon the workpiece rolls off slope 68 and guide bar 67, and over suitable additional roll-off elements. A corresponding reverse configuration of roll-off slope 68 and projection 69 converts the roll-off slope into an inlet slope to make it possible to introduce workpieces laterally into the feed channel.

The feed velocity is preferably increased by a few percentage points from one unit to the next in order to prevent the workpieces from riding up onto each other. That is, the feed velocity imparted to the workpiece is increased from the peeling machine to the feed channel, and from the feed channel to the straightening machine.

The feed channel according to the present invention is particularly suitable for transporting longitudinally bent rods or pipes because when the workpieces are being transported without rotating, they do not scrape along the internal surface of the feed channel and, when they rotate in the feed channel, their longitudinal frictional velocity is reduced because the feed velocity frictional component is reduced or eliminated.

Feeding workpieces in accordance with the improved method of this invention results in improved performance and minimizes damage to the feed channel or workpieces.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true scope and spirit of the invention.

What is claimed is:

1. A feed channel for metal peeling machines and straightening machines for working elongated workpieces, comprising:
    an elongated workpiece feed channel associated with one of said machines and having input and output ends for carrying workpieces therethrough in a predetermined direction, a workpiece handling device positioned adjacent at least one of said ends for operating on elongated workpieces having a predetermined cross-sectional size, said feed channel including a plurality of opposed pairs of profiled elements, drive means for driving said opposed pairs of profiled elements in said predetermined direction, each said pair of opposed profiled elements defining a workpiece receiving opening therebetween having a cross-sectional size approximately 1.5 to 10 times larger than said predetermined cross-sectional size of said workpiece.

2. The feed channel of claim 1 including a closed housing open at said input and output ends, and said opposed pairs of profiled elements being driven through said housing.

3. The feed channel of claim 1 wherein said workpieces have a predetermined cross-sectional shape and said workpiece receiving opening has a cross-sectional shape generally the same as said opening.

4. The feed channel of claim 1 wherein said workpiece handling device is positioned adjacent said input end and includes feed means for feeding said workpieces in said predetermined direction into said input end of said feed channel.

5. The feed channel of claim 4 wherein said feed means feeds said workpieces at a predetermined velocity and said drive means drives said opposed pairs of profiled elements in said predetermined direction at a velocity greater than said predetermined velocity.

6. The feed channel of claim 1 wherein said workpiece handling device is positioned adjacent said output end and includes feed means for feeding said workpieces in said predetermined direction out of said output end of said feed channel.

7. The feed channel of claim 6 wherein said feed means feeds said workpieces at a predetermined velocity and said drive means drives said opposed pairs of profiled elements in said predetermined direction at a velocity less than said predetermined velocity.

8. The feed channel of claim 1 wherein said workpiece handling device is positioned adjacent said input end and defines a first device, and further including a second workpiece handling device positioned adjacent said output end.

9. The feed channel of claim 8 wherein said first device comprises a peeling machine and said second workpiece handling device comprises a straightening machine.

10. The feed channel of claim 1 wherein said opposed pairs of profiled elements are mounted on separate chains driven by said drive means, said chains having working runs wherein said opposed pairs of profiled elements cooperate with one another for feeding said workpieces in said predetermined direction, guide housing means surrounding said working runs and including guide means for guiding said working runs therethrough.

11. The feed channel of claim 10 including a sound deadening housing surrounding said guide housing in outwardly-spaced relationship thereto.

12. The feed channel of claim 1 wherein said opposed pairs of profiled elements include upper and lower elements mounted on separate mechanisms, at least one of said mechanisms being movable away from the other of said mechanisms for providing lateral access to said lower elements, and said lower elements having lateral slopes for lateral movement of said workpieces relative to said lower elements when said mechanisms are moved away from one another.

13. The feed channel of claim 12 wherein said lateral slopes comprise downwardly inclined surfaces on said lower elements for automatic workpiece roll-off from said lower elements when said mechanisms are separated.

14. The feed channel of claim 1 wherein said workpiece handling device includes means for rotating said workpieces relative to said feed channel.

15. A feed channel for feeding elongated workpieces between input and output ends comprising: upper and lower mechanisms including upper and lower opposed pairs of profiled elements defining workpiece receiving openings therebetween, drive means for driving said elements in a predetermined direction in opposed relationship to one another for carrying workpieces received in said openings between said input and output ends, at least one of said mechanisms being movable away from the other of said mechanisms for separating said upper and lower elements for lateral movement of workpieces relative to said lower elements.

16. The feed channel of claim 15 wherein said lower elements include sloping surfaces for lateral rolling movement of workpieces therealong when said upper and lower mechanisms are separated.

17. The feed channel of claim 16 wherein said sloping surfaces are downwardly inclined on said lower elements for automatic discharge of workpieces from between said opposed pairs of profiled elements when said mechanisms are separated from one another.

18. The feed channel of claim 15 wherein said mechanisms include chains carrying said upper and lower profiled elements and said chains have working runs wherein said profiled elements are in opposed relationship to one another to define said workpiece receiving openings, and housing means surrounding said working runs between said input and output ends, said housing means being in separable upper and lower parts carried by said upper and lower mechanisms.

19. A method for feeding elongated workpieces between a metal peeling machine and a metal straightener and including a feed channel having a plurality of opposed pairs of profiled elements including workpiece receiving openings therebetween and being driven in a predetermined direction comprising the steps of: introducing into said openings workpieces having a cross-sectional size approximately 1.5 to 10 times smaller than the cross-sectional size of said openings, and carrying said workpieces between said openings in said predetermined direction, from said metal peeling machine to said metal straightener, by gravity frictional engagement of said workpieces with the surfaces of said openings.

20. The method of claim 19 wherein said opposed pairs of driven profiled elements define a traveling feed channel having input and output ends, and including the steps of performing work on said workpieces adjacent at least one of said ends.

21. The method of claim 20 including the step of feeding workpieces into said input end at a velocity less than the velocity at which said opposed pairs of profiled elements are driven.

22. The method of claim 20 including the step of feeding workpieces out said output end at a velocity greater than the velocity at which said opposed pairs of profiled elements are driven.

23. The method of claim 20 wherein said step of performing work on said workpieces includes the step of rotating said workpieces relative to said traveling feed channel.

* * * * *